US009844907B2

(12) United States Patent
Sandmeyer et al.

(10) Patent No.: US 9,844,907 B2
(45) Date of Patent: Dec. 19, 2017

(54) METHOD AND TOOLING STATION FOR MANUFACTURING A LINING PART

(71) Applicant: Faurecia Innenraum Systeme GmbH, Hagenbach (DE)

(72) Inventors: Ulrich Sandmeyer, Dahn (DE); Harald Peter, Unterhaching (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 387 days.

(21) Appl. No.: 14/270,152

(22) Filed: May 5, 2014

(65) Prior Publication Data
US 2014/0326396 A1    Nov. 6, 2014

(30) Foreign Application Priority Data

May 8, 2013    (DE) .................. 10 2013 008 005

(51) Int. Cl.
*B32B 37/00*    (2006.01)
*B29C 63/00*    (2006.01)
*B29C 63/02*    (2006.01)
*B29L 31/30*    (2006.01)

(52) U.S. Cl.
CPC .......... *B29C 63/0004* (2013.01); *B29C 63/02* (2013.01); *B29C 2063/022* (2013.01); *B29L 2031/3005* (2013.01); *Y10T 156/1028* (2015.01)

(58) Field of Classification Search
CPC ............................ B29C 63/0004; B29C 63/02
USPC ...................... 156/580, 581, 583.1
See application file for complete search history.

(56) References Cited

U.S. PATENT DOCUMENTS

| 5,925,215 A * | 7/1999 | Kon ............... B29C 44/569 156/581 |
| 6,189,589 B1 * | 2/2001 | Tokunaga ............... B29C 51/145 156/497 |
| 8,171,975 B2 * | 5/2012 | Suzuki ................... B29C 65/02 156/538 |

* cited by examiner

Primary Examiner — James Sells
(74) Attorney, Agent, or Firm — Reising Ethington P.C.

(57) ABSTRACT

A method for manufacturing a lining part (L), which is formed from a support part (10) and a decorative layer (20), the method having the steps of:
  moving together a first tool part (210) with a first shaping surface (210a), against which a support part (10) lies, and a second tool part (220) with a second shaping surface (220a), against which a decorative layer (20) lies, wherein a groove section (61) of the support part (10), forming a support part longitudinal groove (50), is situated in a tool depression which is constructed in the first shaping surface (210a),
  extending a positioner (250) mounted in the second tool part (220) into an extended position such that the positioner (250) positions an edge section (25) of the decorative layer (20) such that said edge section projects into a region (60) bounded by the support part longitudinal groove (50),
  extending a slider (270) adjacent to the extended positioner (250) such that an edge section of the slider (270) presses the edge section (25) of the decorative layer (20) onto a groove lateral face (33) of the support part longitudinal groove (50),
  heating the semi-finished parts for connecting the decorative layer (20) with the support part (10) and forming the interior lining part (L).
and a tooling station to carry out the method.

4 Claims, 9 Drawing Sheets

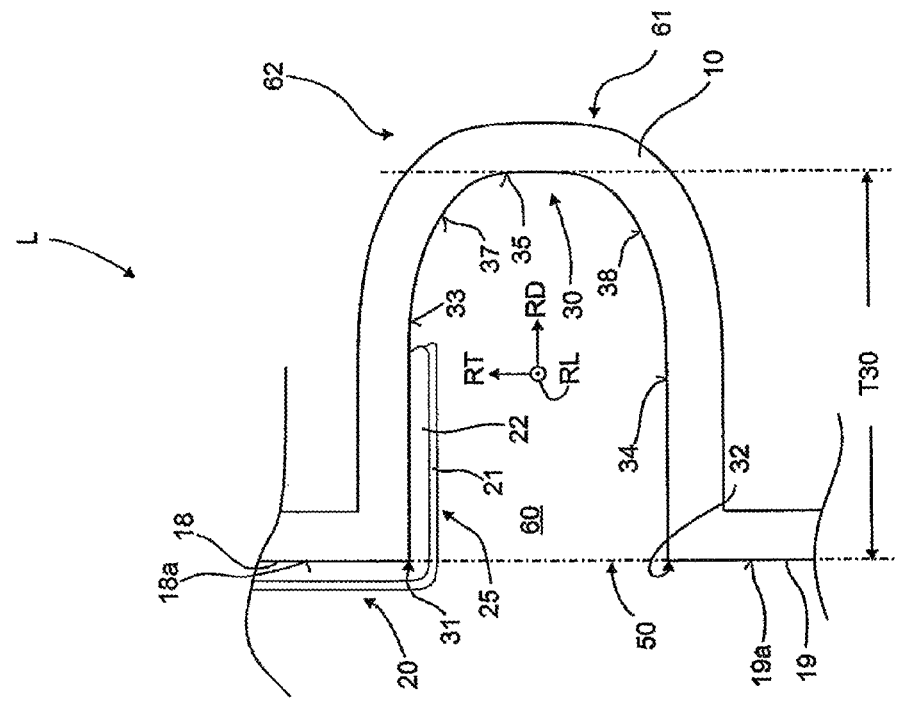
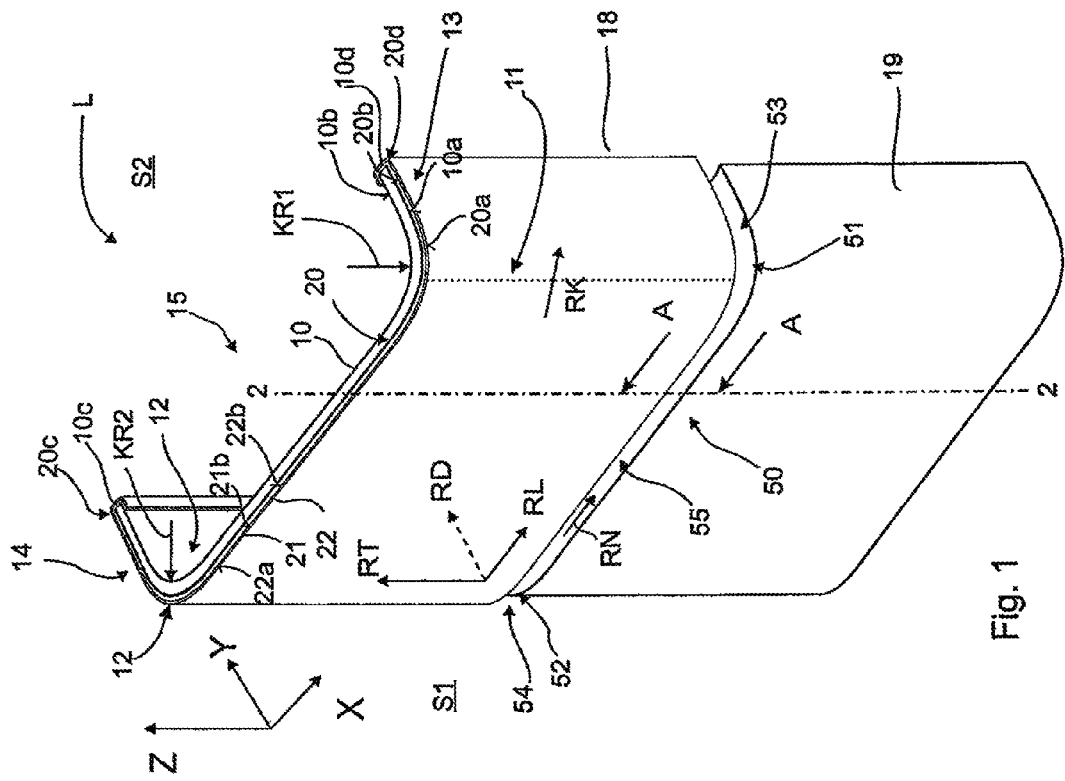
Fig. 1
Fig. 2

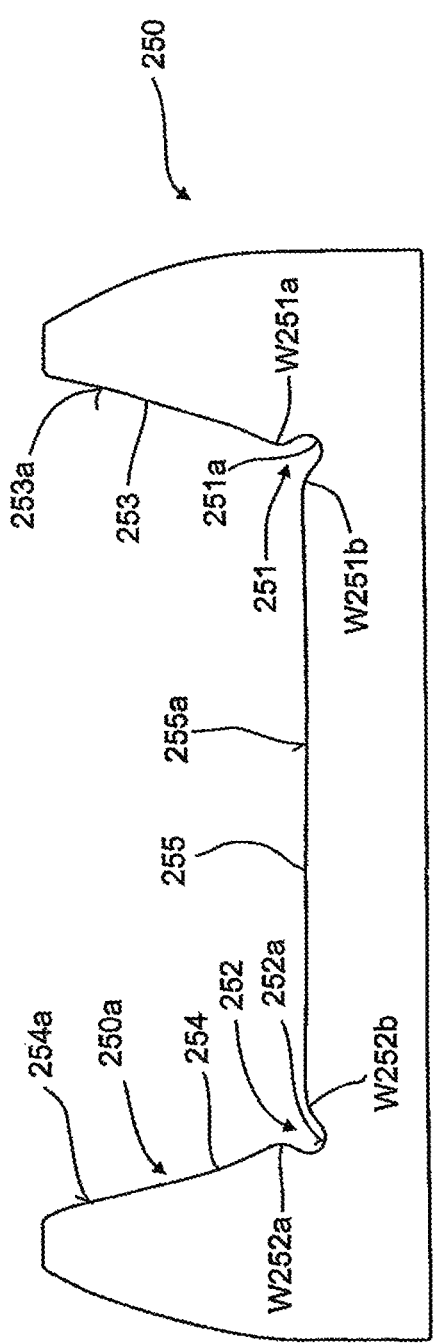
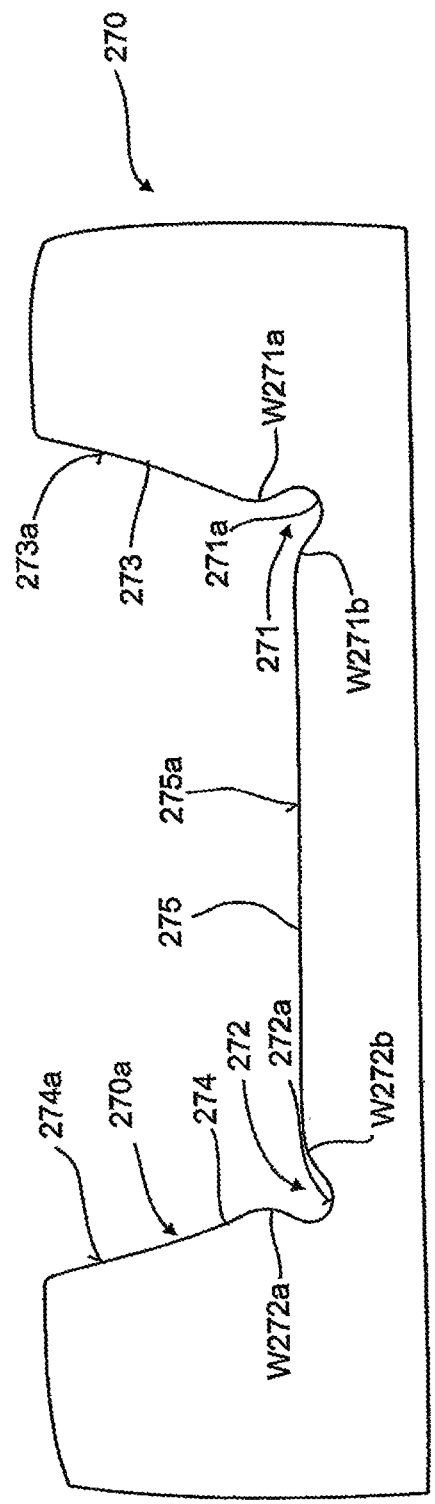

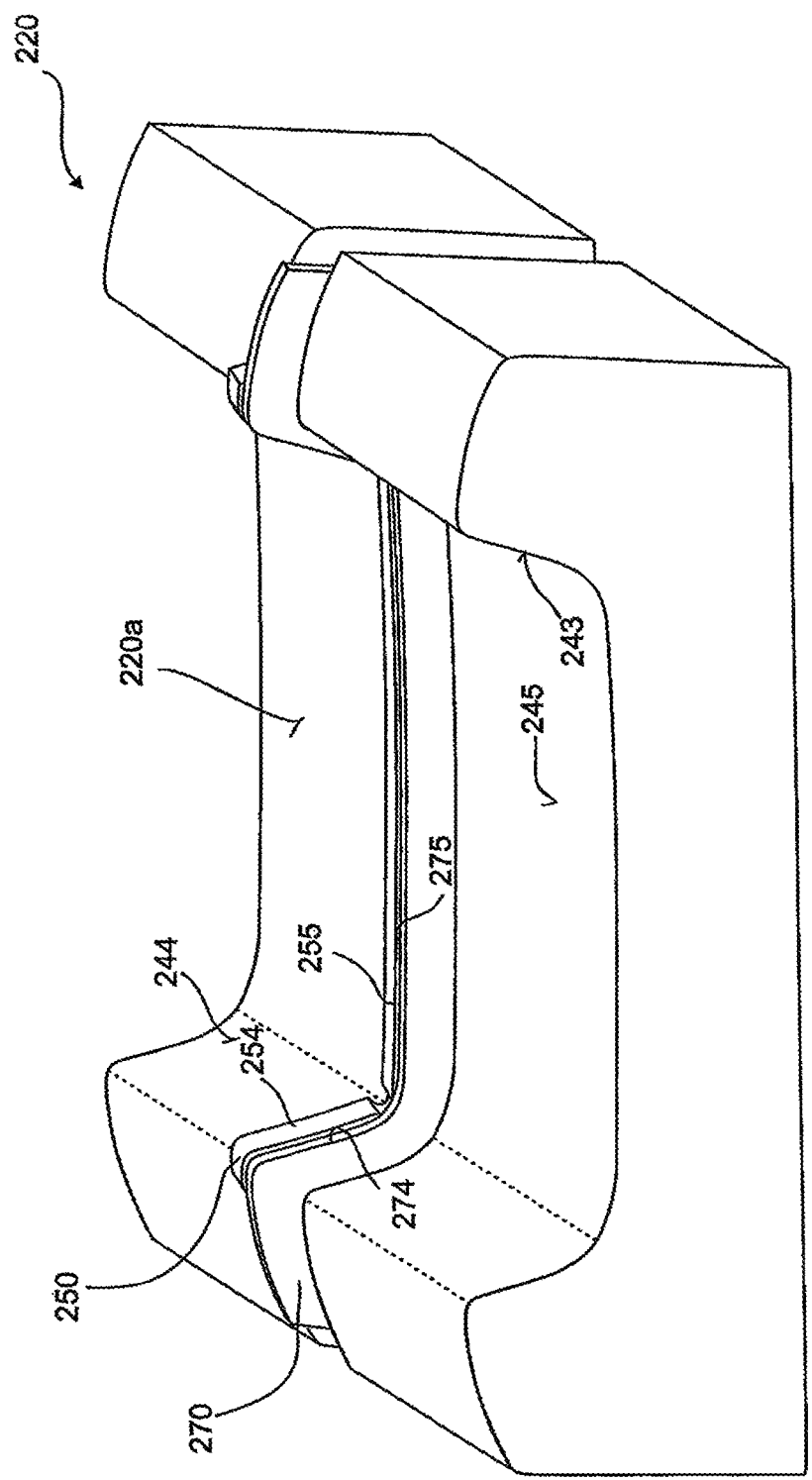

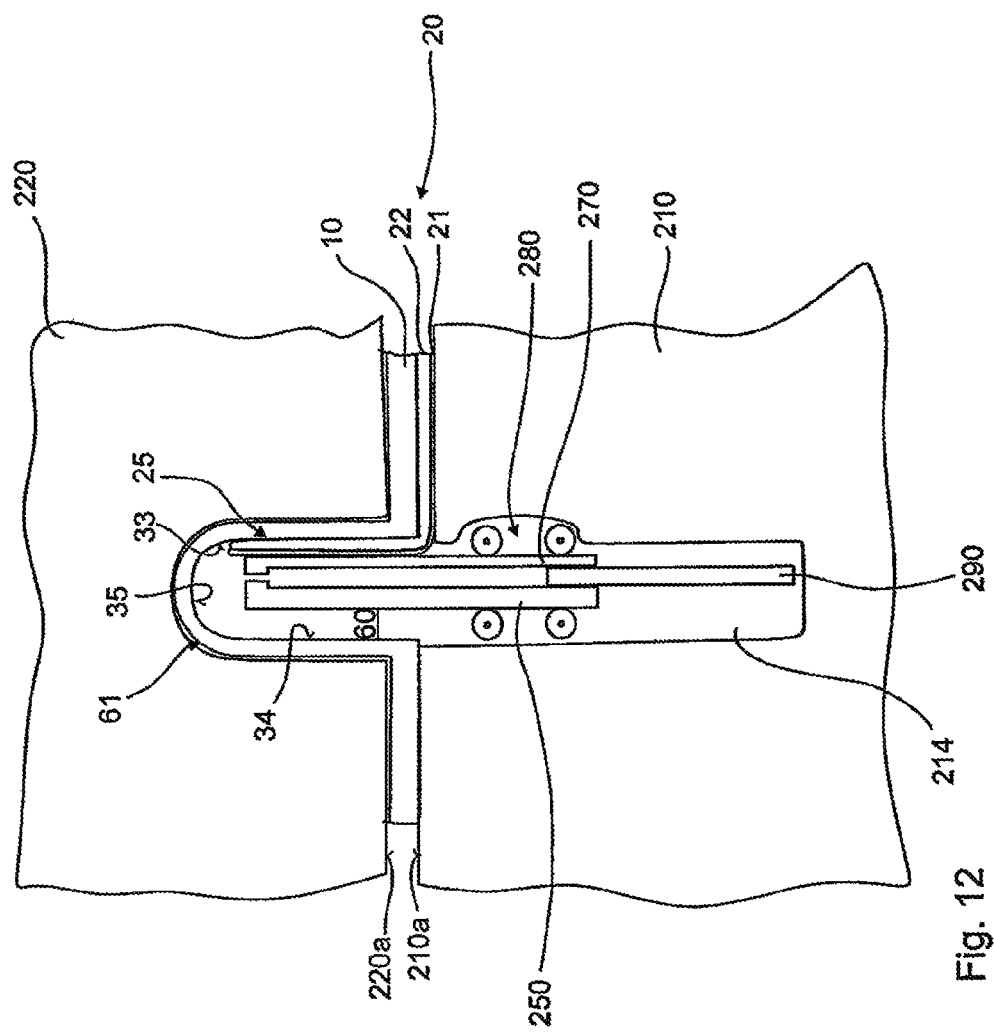

METHOD AND TOOLING STATION FOR MANUFACTURING A LINING PART

TECHNICAL FIELD

The invention relates to a method and a tooling station for manufacturing a lining part. The lining part is, in particular, an interior lining part of a motor vehicle.

BACKGROUND

DE 4237274 C2 describes such a method and such a device for manufacturing a lining part.

SUMMARY

The invention is based on the problem of providing a tooling station and a method for manufacturing a lining part, by which the lining part is formed in an efficient manner from a support part with a support part longitudinal groove and from a decorative layer which is situated thereon, wherein the support part has a groove section and wherein the decorative layer extends laterally to the support part longitudinal groove and an edge section of the decorative layer lies against a groove lateral face.

This problem is solved by the features of the independent claims. Further embodiments of the invention are indicated in the claims which refer back thereto respectively.

The method according to the invention permits a favourably priced manufacture of the lining part. Furthermore, forms of the lining part can be manufactured by the method according to the invention without the need for additional working steps such as a sewing process.

According to an aspect of the invention, a method is provided for manufacturing a lining part, which is formed from a support part and a decorative layer, wherein the method has the steps of:
  moving together a first tool part with a first shaping surface, against which a support part lies, and a second tool part with a second shaping surface, against which a decorative layer lies, wherein a groove section of the support part, forming a support part longitudinal groove, is situated in a tool depression which is constructed in the first shaping surface,
  extending a positioner mounted in the second tool part into an extended position such that the positioner positions an edge section of the decorative layer such that said edge section projects into a region bounded by the support part longitudinal groove,
  extending a slider adjacent to the extended positioner such that an edge section of the slider presses the edge section of the decorative layer onto a groove lateral face of the support part longitudinal groove,
  heating the semi-finished parts for connecting the decorative layer with the support part and forming the interior lining part.

Therefore heating the semi-finished parts for connecting the decorative layer with the support part and forming the interior lining part.

According to a further embodiment of the method according to the invention, provision is made that the first shaping surface has a tool surface central section and at least one tool surface lateral section which is oriented differently to the tool surface central section,
that the second shaping surface is shaped in a complementary manner to the first shaping surface, has a tool surface central section and at least one tool surface lateral section which is oriented differently to the tool surface central section.

According to a further embodiment of the method according to the invention, provision is made that the positioner is extended during the moving together of the first and of the second tool part.

According to a further embodiment of the method according to the invention, provision is made that after an opening of the tooling station the formation of an edgefold takes place on at least an end section of the support part, by an edge region, projecting on the respective end section of the support part, being turned over from the visible side to the reverse side of the support part by means of a respective edgefold slider.

According to a further embodiment of the method according to the invention, provision is made that the slider is heated in the extended state, in order to bring the edge section of the decorative layer in connection with the lateral flank.

According to a further embodiment of the method according to the invention, provision is made that the support part is a thermoset material.

According to a further embodiment of the method according to the invention, provision is made that the support part is a thermoplastic.

According to a further aspect of the invention, a tooling station is provided for manufacturing a lining part, which is formed from a support part and a decorative layer situated thereon, wherein the support part has a groove section or convexity section forming a support part longitudinal groove and wherein the decorative layer extends laterally to the support part longitudinal groove and an edge section of the decorative layer lies against a groove lateral face, the tooling station having:
  a first tool part with a first shaping surface to receive the support part, wherein in the first shaping surface a tool groove is constructed to receive or form the support part longitudinal groove,
  a second tool part with a second shaping surface to receive the decorative layer, wherein the second tool part has: a tool recess, a positioner, which is movable by means of an adjustment device, coupled therewith, from a retracted position in the tool recess into a position partially extended from the latter, a slider, which is movable by means of an adjustment device, coupled therewith, from a retracted position in the tool recess into a position partially extended from the latter,
  wherein the positioner and the slider are arranged in the second tool part such that in their extended position they project respectively with an end section into the tool groove of the first tool part and
  wherein the end section of the slider is situated adjacent to a groove lateral face of the tool groove such that it brings an end section of the decorative layer semi-finished part, situated on a lateral wall of the support part longitudinal groove, into abutment thereto.

According to a further embodiment of the tooling station according to the invention, provision is made that the second tool part has an adjustment device coupled with the positioner, and an adjustment device coupled with the slider, with which respectively the positioner and the slider are movable from a retracted position into a position partially extended therefrom.

Provision can be made here in particular that the positioner and the slider are movable by means of the same adjustment device.

According to a further embodiment of the tooling station according to the invention, provision is made that the first shaping surface has a tool surface central section and at least one tool surface lateral section oriented differently to the tool surface central section, that the second shaping surface is formed in a complementary manner to the first shaping surface, has a tool surface central section and at least one tool surface lateral section oriented differently to the tool surface central section. Provision is made in particular here that in the state of the tooling station when moved together, the tool surface central section of the second shaping surface lies against the tool surface central section of the first shaping surface and the at least one tool surface lateral section of the second shaping surface lies against the tool surface lateral section of the first shaping surface.

In this context, the term "transverse" is to indicate generally an orientation of a direction in relation to a reference direction, which deviates from the reference direction with an angle of less than 90 degrees. In specific embodiments in this context generally the term "transverse" can indicate in particular an orientation of a direction with respect to a reference direction, which deviates from the reference direction with an angle of less than 45 degrees.

BRIEF DESCRIPTION OF THE DRAWINGS

Embodiments of the invention are described below with the aid of the enclosed figures, which show:

FIG. 1 a perspective illustration of an embodiment of a lining part which is manufactured according to the invention, FIG. 2 a cutout of a cross-section of the embodiment of the lining part according to FIG. 1, wherein the cross-section is produced on the basis of the section line 2-2 drawn in FIG. 1 and the viewing direction designated by the arrows "A", FIG. 3 a tooling station for carrying out a deformation method for the manufacture of the lining part in open state, wherein the semi-finished parts for manufacturing the support layer and the decorative layer are arranged in the tooling station, wherein the semi-finished parts for manufacturing the support layer and the decorative layer are not arranged in the tooling station;

FIG. 6 a lateral view of an embodiment of the positioner, which according to the invention is movably arranged in a first tool part of the tooling station according to FIG. 3;

FIG. 7 a lateral view of an embodiment of the slider, which according to the invention is movably arranged in a first tool part of the tooling station according to FIG. 3;

FIG. 11 the first tool part with the positioner according to FIG. 5 and with the slider according to FIG. 6, wherein the positioner and the slider are respectively situated in an extended position;

FIG. 12 the tooling station according to FIG. 3 in the illustration of FIG. 8, wherein the positioner and the slider are respectively situated in the extended position, so that the slider places an edge section of the decorative layer onto a lateral flank of the carrier part groove.

DETAILED DESCRIPTION

Figure 3:
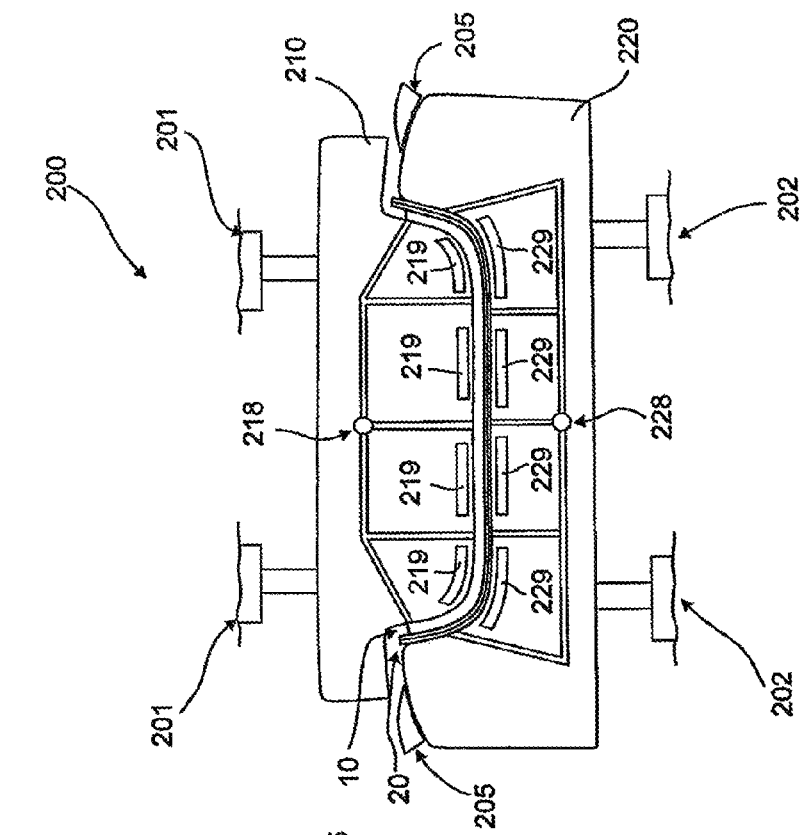

According to the invention, a lining part 1 in particular for the interior of a vehicle is manufactured by the method according to the invention and the manufacturing device according to the invention. In FIG. 1 a space-fixed coordinate system is entered with an X axis, a Y axis and a Z axis. Furthermore, in FIG. 1 a local coordinate system of the lining part 1 is entered, which defines a longitudinal direction RL, a thickness direction RD and a depth direction RT, which in this sequence define a Cartesian coordinate system. The longitudinal direction RL of the support part 10 can be defined in particular as a tangent to the connecting line of a respective centre of area of the centres of area of the support part groove 50. Here, in particular, the areas of the cross-sectional areas of the support part groove 50 can be used which are the smallest areas at the respective location of the support part groove 50. The thickness direction D can be defined in particular by the shortest distance between respectively a point of the surface 10a and a point of the surface 10b of the support part 10.

The interior lining part L according to the invention has a support part 10 and a decorative layer 20 situated thereon. The decorative layer 20 has a first surface 20a and a second surface 20b oriented in opposition thereto, which lies against a first surface 10a of the support part 10. The first surface 20a of the decorative layer 20 therefore forms an outer face of the interior lining part 1 in its installed state, viewed from a visible side S1, and in so doing faces the interior IR of the vehicle. The support part 10 has a second surface 10b, which faces a reverse side S2, which is situated in opposition to its first surface 10a.

The decorative layer 20 can be formed in a single layer. This can be the case in particular when the decorative layer is a leather blank or a synthetic leather blank. Alternatively, the decorative layer 20—as is illustrated in FIGS. 1, 2 and 8 to 10—can be formed from a covering film or a decorative film 21, the first surface of which is the first surface 20a of the decorative layer 20, and of an intermediate layer 22, which is situated between the covering film 21 and the support part 10. In particular, provision can be made that the decorative layer 20 consists of a covering film 21 and a foam layer 22. Here, a second surface 21b of the covering film 21, oriented in opposition to the first surface 21a, lies against a first surface 22a of the foam layer 22. The intermediate layer 22 has a second surface 22b, oriented in opposition to its first surface 22a, which second surface lies against the first surface 10a of the support part 10.

The decorative layer 20 can also be formed from or consist of more than two layers. For example, the decorative layer 20 can be formed from a covering film 21 and a foam layer and a reinforcing layer, situated between these, in particular of the type previously described.

Generally, the interior lining part 1 can be a door lining. The interior lining part 1 can also be an instrument panel or a part thereof. In a further case of application, the interior lining part 1 can be a cover of a centre console.

The support part 10 can be formed from polypropylene (PP) which can contain natural fibres, ceramic fibres, carbon fibres or glass fibres or a combination thereof. The support part 10 can also be formed from an ABS plastic material (acrylonitrile butadiene styrene copolymer plastic) or polyurethane. The support part 10 can also be formed from a thermoset material.

The intermediate layer 22 can be formed in particular as a reinforcement layer, which has in particular a layer of glass fibre fabric, which can be situated between the material layer and the decorative layer or beneath the support layer, i.e. on the side of the support layer situated in opposition to the side facing the decorative layer. The intermediate layer 22 can also be formed as a foam layer and in particular as a PU (polyurethane) foam. Also, such a foam layer can be formed from polyolefin and in particular from a thermoplastic olefin (TPO). The use of a foam layer as intermediate layer 22 is intended to produce an improved feel of the finished, i.e. manufactured, interior lining part 1 or decorative part in the region of the base decorative layer.

The covering film 21 can be formed in particular from a textile layer. Also, this can be formed from leather or synthetic leather. Alternatively, the decorative layer can be a compact film. The film layer can be formed in particular from TPO (thermoplastic polyolefin) or from PVC (polyvinyl chloride).

According to the invention, the lining part L can have at least one curvature section and in so doing, in particular with the presence of one curvature section, can be formed in an L-shape or with the presence of two curvature sections, can be formed in a trough shape. The embodiment of the lining part L shown in FIG. 1 has two curvature sections 11, 12, wherein the lining part L has a central section 15 situated between the curvature sections 11, 12, and is thereby formed in a trough shape. Therefore, the indicators of the local radii of curvature KR1 at the respective curvature sections 11, 12 are situated on the reverse side S2 and therefore on the side which is formed by the second surface 10b of the support part 10 (FIG. 1). The local radii of curvature KR1 run transversely to the local thickness direction RD of the lining part L.

Viewed from the central section 15 behind the curvature sections 11, 12, a lateral section 13 or respectively 14 of the lining part L is respectively situated. According to an embodiment of the interior lining part 1, the curvature section 11, 12 is therefore a transition section connecting the central section 15 and the first or respectively second curvature section 11, 12 and is configured such that the central section 15 in its two-dimensional extent and the first or respectively second lateral section 13, 14 in their two-dimensional extents have as a whole different orientations to one another. Accordingly, the support part groove 50 has: a groove central section 55 situated in the region of the central section 15, groove curvature sections 51 or respectively 52 situated in the regions of the curvature sections 11, 12, and groove lateral sections 51 or respectively 52 situated in the regions of the lateral sections 11, 12, wherein the groove central section 55 and the groove curvature sections 51 or respectively 52 together form the support part groove 50.

Generally, the support part 10 can also be embodied without the first lateral section 13 or the second lateral section 14 or also without the combination of the lateral section 13 and of the second lateral section 14. The same applies for the respective interior lining part 1.

The respective curvature section 11, 12 of the support part 10 forms respectively a curvature which is constructed in a curvature direction RK, along which the curvature, i.e. the continuously changing direction of the tangent is constructed onto the surface of the respective curvature section 11, 12, wherein the curvature, viewed from the visible side S1, can be shaped so as to be concave or convex. Therefore, the curvature is provided in the direction in the course of which a central vector, situated in the lining part L, carries out a continuous change of direction which, viewed from the central section 15, leads in the direction of the reverse side S2. According to an embodiment of the lining part L with at least one lateral section 13, 14, the change of direction within a respective curvature section 11, 12 is at least 10 degrees. The support part longitudinal direction RL can, as is shown in FIG. 1, be directed in particular in the direction in which the curvature is formed and can therefore run along the curvature direction RK. There can also be a further curvature here, which extends transversely to the previously mentioned curvature direction RK, so that the respective curvature section 11, 12 forms a torus section.

In the embodiments of the lining part L according to the invention, the curvature sections 11, 12 of the support part 10 are shaped so as to be convex, viewed from the visible side S1.

Furthermore, the support part 10 has a convexity section 61, which forms a convexity which is produced in a support part cross-section of the support part 10 and extends in a groove longitudinal direction RN. On the visible side S1 of the support part 10, the convexity section 61 forms a support part longitudinal groove or support part groove 50. The respective interior region which is produced in the respective cross-section of the support part longitudinal groove 50, is designated in FIG. 2 by the reference number 60. Therefore, the support part longitudinal groove 50 runs in a groove longitudinal direction KR, which extends along the curvature direction KR of the curvature direction and in particular in the curvature direction KR through the curvature section. Laterally to the support part longitudinal groove 50, a first and a second support part section 16 or respectively 17 extend, which are therefore separate from the support part longitudinal groove 50. Therefore, viewed in the longitudinal direction L and along the support part groove 50, the support part 10 has:

a first support part lateral region 18 extending from the support part groove 50 on a first side with a first lateral region surface 18a as part of the first surface 10a of the support part 10, a second support part lateral region 19 extending from the support part groove 50 on a second side with a first lateral region surface 19a as part of the first surface 10a of the support part 10.

The support part groove 50 is constructed such that on the first surface 10a of the support part 10 it provides a depression 30 with a groove depth T30 and on the second surface 10b of the support part 10 it provides a convexity 62.

The curvature of the support part 10, formed by the respective curvature section 11, 12, is embodied such that the depression 30, in top view onto the latter from the visible side S1, forms a convex shape of the first surface 10a, and the convexity 40 of the support part 10, in top view onto the latter from the reverse side S2, forms a convex surface of the second surface 10b.

To form the depression 30, the support part groove 50 has:
- a first lateral flank 33 adjoining the first longitudinal section surface 18a of the first support part longitudinal section 18 via a first outer corner region 31,
- a second lateral flank 34 adjoining the second longitudinal section surface 19a of the second support part longitudinal section 19 via a second outer corner region 32, which second lateral flank lies opposite the first lateral flank 33,
- a first inner transition region or corner region 37 adjoining the first lateral flank 33 viewed from the first outer corner region 31,
- a second inner transition region or corner region 38, adjoining the second lateral flank 34 viewed from the second outer corner region 32,
- a groove base surface 35 connecting the first inner corner region 37 and the second inner corner region 38.

The interior lining part 1 has a decorative layer 20 lying partially on a first surface 10a of the support part 10 facing the visible side S1. The decorative layer 20 covers the support part groove 50 in the region of the curvature section 11, 12 transversely to the longitudinal direction 50. In the lining part L according to the invention, the decorative layer 20 is laminated on the support part 10 such that it is situated on the first support part section 18 or second support part section 19 and that an edge section 25 of the decorative layer 20 is situated in the support part groove 50. In the lining part L illustrated in the figure, the decorative layer 20 is laminated on the support part 10 such that it is situated on the first support part section 18 and partially on the first lateral flank 33. Provision can also be made here that an end section of the edge section 25 of the decorative layer 20 additionally extends over transition region or corner region 37, optionally also at least partially over the groove base surface 35 and optionally also at least partially over the second lateral flank 34. The configurations analogous thereto can be provided if the decorative layer 20 is laminated on the support part 10 such that it is situated on the second support part section 19 and partially on the first lateral flank 33.

According to an embodiment of the support part 10 or of the lining part L, the support part 10 or respectively the lining part L has, in a region which extends on both sides of the support part groove 50 and over the support part groove 50, no change of curvature of the surface of the support part 50 or respectively of the lining part L, viewed in the groove longitudinal direction RN, so that the support part 10 or respectively the lining part L is formed in this region consistently preferably convex or concave, respectively viewed from the visible side S1. This region can be defined as the region that this extends along the support part longitudinal direction RL or respectively the longitudinal direction of the lining part L at least in the region of the double distance of the width of the interior region 60 starting from the respective centre of area of the interior region 60 perpendicularly to the respective coordinate of the groove longitudinal direction RN. The width of the internal region 60 can be defined here as the smallest distance in its cross-section situated perpendicularly to the groove longitudinal direction RN, wherein the smallest distance is the length of the shortest connecting line of points of the groove lateral flanks 33, 34, lying opposite one another, of the same internal region 60, which runs through the respective centre of area of the internal region 60.

In an embodiment of the lining part L according to the invention, the curvature sections 11, 12 of the support part 10, viewed from the visible side S1, are shaped consistently convex or concave, i.e. the support part 10 or respectively the lining part L has over its respective entire surface, viewed in the groove longitudinal direction RN, no change of curvature of the surface of the support part 10 or respectively of the lining part L.

In these embodiments of the support part 10 or of the lining part L, the curvature sections 11, 12 can be defined such that they have respectively at each coordinate of the depth direction RT a point of the greatest curvature of the surface. At this point, a tangent lies in the longitudinal direction RL on the surface of the support part 10 or respectively of the lining part L. The length of the respective curvature section 11, 12 in longitudinal direction RL can be defined such that the length extends from this point of the greatest curvature in both directions, opposed to one another, of the longitudinal direction RL, i.e. its positive or respectively negative direction, over five times the thickness of the support part 10 at this point. In particular also the length of the respective curvature section 11, 12 in the longitudinal direction RL can be defined by two times the thickness of the support part 10 at this point.

A different orientation of two surfaces is understood herein to mean that the surfaces, viewed in a reference longitudinal direction, deviate from one another by at least 30 degrees, i.e. that the tangents running in this reference longitudinal direction on these surfaces on each comparative points of the surfaces deviate from one another by at least 30 degrees. In the embodiments of the support part 30 or of the lining part L, in which the orientation of the at least one lateral section 13 or respectively 14 has a different orientation to the orientation of the central section 15, the tangents running in the longitudinal direction RL on the surfaces of the one lateral section 13, 14 and the tangents running in the longitudinal direction RL on the surface of the central section 15 form an angle of at least 30 degrees to one another. As an alternative to the above-mentioned definition of the length of the at least one curvature section 11, 12 in the reference longitudinal direction or respectively the longitudinal direction RL, this can also be defined respectively such that at the outer ends of the respective at least one curvature section 11, 12, viewed in the reference longitudinal direction or respectively the longitudinal direction RL, an orientation difference of the tangents to one another by 30 degrees exists. In other embodiments, the angle can also be respectively 50 degrees instead of 30 degrees.

The manufacture of the interior lining part L can take place in particular by a compression moulding method of a tooling station 100. Here, a pre-formed shaped part can be used as semi-finished part or starting material for the support part 10, onto which a semi-finished part for the decorative layer 20, provided according to the invention, is laminated. The pre-forming of the support part 10 can take place here in a pre-forming station with two tool parts, between which the starting material is situated for the formation of the pre-formed shaped part.

As starting material for such a pre-formed shaped part, a thermoplastic material or a thermosetting material can be used, which is inserted into the tooling station as a solid shaped part, i.e. rigid in itself and in particular hardened or also cured. The pre-formed shaped part is hardened such that it can be used as a dimensionally stable preform for the laminating method according to the invention.

According to an embodiment of the method according to the invention, alternative thereto, for manufacturing the interior lining part 1 according to the invention, a plasticized mat can be used as starting material for the support part 10. Here, the mat-shaped starting material can be a mat containing plastic and fibres and especially a polypropylene (PP)-bonded fibre mat. Also, an ABS plastic material (acrylonitrile butadiene styrene copolymer plastic) can be used as starting material for the support part 10, in particular in the form of plates. In this manufacturing method, the material for the support part is able to be plasticized in particular by the application of heat. In this case also the pre-formed shaped part is hardened such that it can be used as a dimensionally stable preform for the laminating method according to the invention.

In particular for the cases of the method according to the invention, in which a semi-finished part made of thermoplastic material is used for the manufacturing of the support part 10, generally provision can be made that the decorative layer respectively used for the manufacturing of the lining part is heated by means of a heating device (not illustrated), before or whilst the preform, in the form of the support part 10, is fed to a tooling station in the form of a pressure forming device and is inserted therein.

The manufacture of the lining part L according to the invention takes place in a device for the manufacture of the lining part or a tooling station 200, which has a first tool part 210 with a first shaping contour surface 210a for the application of the support part 10, and a second tool part 220 with a second shaping contour surface 220a for the application of the decorative layer 20 (FIG. 3). The tool parts 210 and 220 are movable relative to one another by means of operating devices 201 or respectively 202.

For the manufacture of the lining part L according to FIG. 1, the first shaping contour surface 210a can have: a tool surface central section 235 corresponding to the shape of the support part central section 15, and respectively a tool surface lateral section 233 or respectively 234 corresponding to the shape of the support part lateral sections 13, 14. A respective tool surface lateral section 233 or 234 extends in an orientation which is different to the orientation of the tool surface central section 235. Here, a transition section 231 or respectively 232 with continuous curvature can be situated between the respective tool surface lateral section 233 or respectively 234 and the tool surface central section 235. In an analogous manner, for the manufacture of the lining part L according to FIG. 1, the second shaping contour surface 220a, which is formed in a complementary manner to the first shaping contour surface 210a, can have: a tool surface central section 245 corresponding to the support part central section 15, and respectively a tool surface lateral section 243 or respectively 244 corresponding to the support part lateral sections 13, 14. A respective tool surface lateral section 243 or 234 extends in an orientation which is different to the orientation of the tool surface central section 235, so that the trough shape of the support part 10 is able to be produced according to FIG. 1. Here, a transition section 241 or respectively 242 with continuous curvature can be situated between the respective tool surface lateral section 243 or respectively 244 and the tool surface central section 245.

By the second shaping contour surface 220a being formed in a complementary manner to the first shaping contour surface 210a, between these an interior lining part can be manufactured having a substantially consistent thickness over its cross-section.

According to an embodiment of the tooling station 200, the first shaping contour surface 210a has only one tool surface lateral section 233 or 234, and the second shaping contour surface 220a has only one tool surface lateral section 243 or respectively 244, in order to form a lining part which is L-shaped in cross-section.

According to a further embodiment of the tooling station 200, the first shaping contour surface 210a and the second shaping contour surface 220a is formed so as to be largely level and has respectively no surface section which has an orientation different to another surface section.

The tooling station 200 can also have edgefold sliders 204, 205 (FIGS. 2 and 4), which are displaceable by means of an operating device relative to the second tool part 220 such that with these from an overlap 20c, 20d of the decorative layer an edgefold can be produced on a respective end section of the support part 10.

In the first shaping contour surface 210a an elongated tool depression or tool groove is formed (not shown in the figures), which is shaped such that the convexity of the groove section 61 on the reverse side S2 of the carrier part 10 is received therein. In particular as tangent to the connecting line of a respective centre of area of the centres of area of the tool groove can be defined as reference longitudinal direction or tool groove longitudinal direction of the first shaping contour surface 210a. Here, in particular, the areas of the cross-sectional areas of the tool groove can be used which are the smallest areas at the respective point of the tool groove.

In an analogous manner for the configuration of embodiments of the support part 10 which is to be manufactured or of the lining part L, in an embodiment of the first shaping contour surface 210a, the latter has, in a region which extends on both sides of the tool groove, viewed in the tool groove longitudinal direction of the first shaping contour surface 210a, no change of curvature of the surface of the first shaping contour surface 210a, so that the first shaping contour surface 210a is formed in this region consistently preferably convex or concave, respectively viewed from the second shaping contour surface 220a. This region can be defined as the region that this extends along the tool groove longitudinal direction at least in the region of the double distance of the width of a tool groove internal region starting from the respective centre of area of the tool groove internal region perpendicularly to the respective coordinate of the tool groove longitudinal direction. Here, the width of the tool groove interior region can be defined as the smallest distance in its cross-section situated perpendicularly to the tool groove longitudinal direction, wherein the smallest distance is the length of the shortest connecting line of points of the groove lateral flanks, lying opposite one another, of the same tool groove internal region, which runs through the respective centre of area of the tool groove internal region.

In an embodiment of the first shaping contour surface 210a according to the invention, the transition sections 231 or respectively 232, viewed from the second shaping contour surface 220a, are shaped consistently convex or concave, i.e. the first shaping contour surface 210a has, viewed over its respective entire surface, in the tool groove longitudinal direction, no change of curvature of the surface of the support part 10 or respectively of the lining part L.

In these embodiments of the first shaping contour surface 210a, the at least one transition section 231 or respectively 232 can be defined such that the latter has a point of the greatest curvature of the surface respectively at each coordinate of the transverse direction running perpendicularly to the tool groove longitudinal direction. At this point a tangent lies in the tool groove longitudinal direction on the surface of the first shaping contour surface 210a.

Herein, different orientation of tool surface central section 235 and of the respective tool surface lateral section 233 or respectively 234 is understood to mean that the respectively compared surfaces, viewed in the tool groove longitudinal direction, deviate from one another by at least 30 degrees, i.e. that the tangents running in this reference longitudinal direction on these surfaces deviate from one another at every comparative point of the surfaces by at least 30 degrees. In the embodiments of the first shaping contour surface 210a, in which the orientation of the at least one tool surface lateral section 233 or respectively 234 has a different orientation to the orientation of the tool surface central section 235, the tangents running in the tool groove longitudinal direction on the surfaces of the one tool surface lateral section 233 or respectively 234 and the tangents running in the tool groove longitudinal direction on the surface of the tool surface central section 235 form an angle of at least 30 degrees to one another. For the definition of the length of the at least one transition section 231 or respectively 232 in the reference longitudinal direction or respectively the tool groove longitudinal direction, this can be defined respectively such that on the outer ends of the respectively at least one transition section 231 or respectively 232, viewed in the reference longitudinal direction or respectively the tool groove longitudinal direction, an orientation difference of the tangents to one another by 30 degrees exists. In other embodiments, the angle can also be respectively 50 degrees instead of 30 degrees.

In FIG. 3, the first tool part 210 and the second tool part 220 have respectively an optionally provided vacuum device 219 or respectively 229, by which e.g. a support part 10 lying against the first shaping tool surface 215 or a respectively provided decorative part 20 of the second tool part 220, lying against the second shaping tool surface 220a, can be suctioned. In particular, provision can be made in these respective states that the support part 10 which is lying against, or respectively the decorative part 20 which is lying against, is heated (not illustrated) by means of a heating device 219 or respectively 229 which is integrated in the first tool part 210 or respectively in the second tool part 220. Thereby, in particular the mentioned pre-heating stage can be dispensed with.

An elastic support or sliding support (not illustrated in the figures) can be situated partially or continuously on one or both of the shaping tool surfaces 221, 220a. This support can be, in particular, a mat or a pad of polyurethane (PU) or a silicone pad or formed respectively therefrom. Through this, in particular a good sliding effect can be achieved between the semi-finished part situated on the respective tool surface 210a, 220a and the respective tool surface 210a, 220a. The sliding support can be arranged here on a section of the respective tool surface 210a, 220a, in which according to the respective embodiment of the manufacturing method a movement of a section of the semi-finished part arrangement is provided on the respective tool surface 210a, 220a.

A positioner 250 and a slider 270 are arranged in a tool recess 214 of the first tool part 210. The positioner 250 and the slider 270 are displaceable by means of an adjustment device 280 relative to the first tool part 210 respectively between a retracted and an extended position on a guide device 290. The adjustment device can be embodied such that the positioner 250 and the slider 270 are displaceable independently of one another relative to the first tool part 210. The adjustment device can also be embodied such that the movements of the positioner 250 and of the slider 270 are coupled functionally with one another by a mechanical coupling device or by an electronic control, so that the movement of the positioner 250 and the movement of the slider 270 are carried out in a coupled manner in accordance with the method steps according to the invention.

The positioner 250 and the slider 270 are configured such that an edge region section 252 of the positioner 250 and an edge region section 272 of the slider 270 are able to be moved together into the support part groove 50, whilst the edge region section 25 of the decorative layer 20 is situated in the region of the support part groove 50. An edge region section or edge section of the positioner 250 or of the slider 270 can be defined in this connection such that it is respectively a section of the outermost edge line which is produced as connecting line of the points which are situated closest to the first shaping contour surface 210a.

Figure 5:
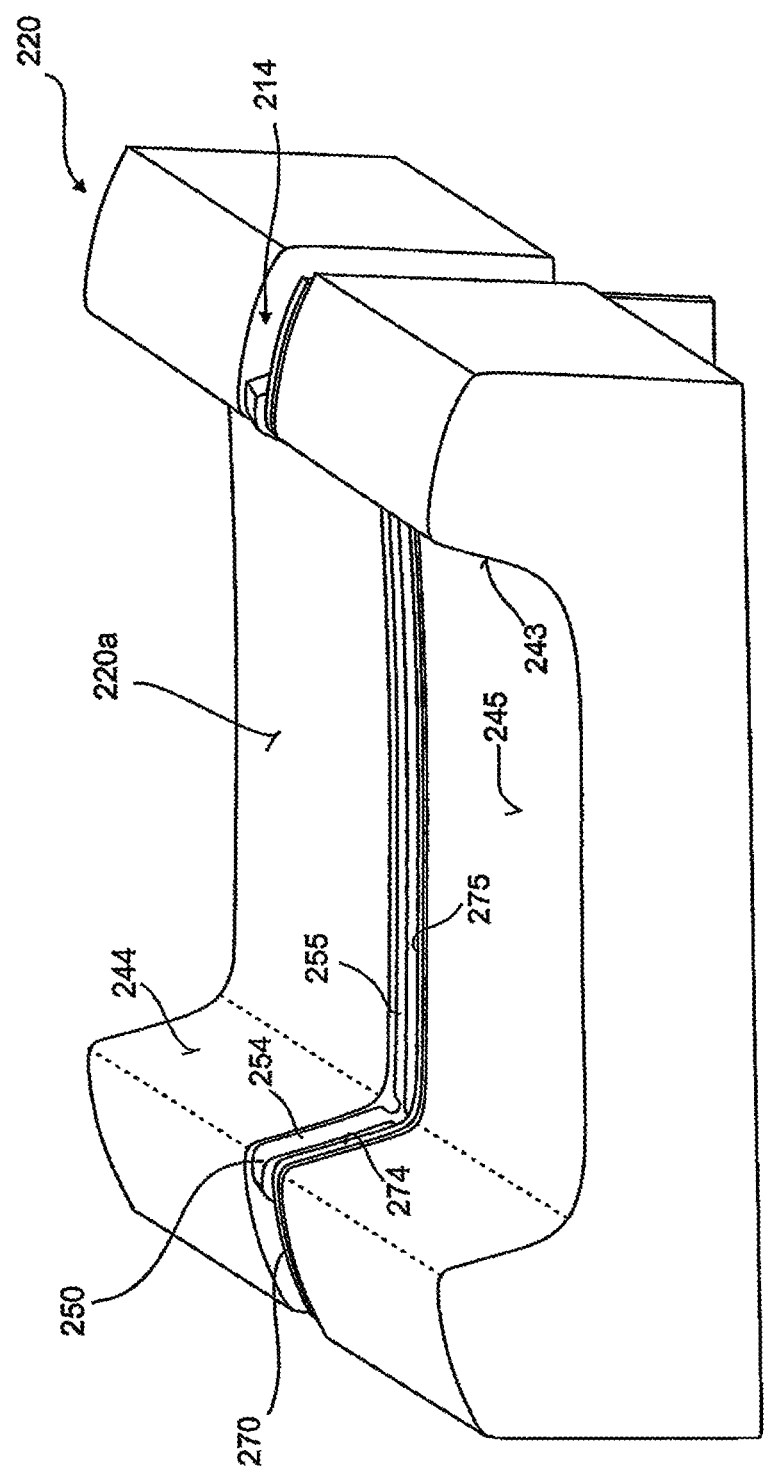
FIG. 5 the first tool part with a positioner and a slider, which are movable relative to the first tool part.
Figure 8:
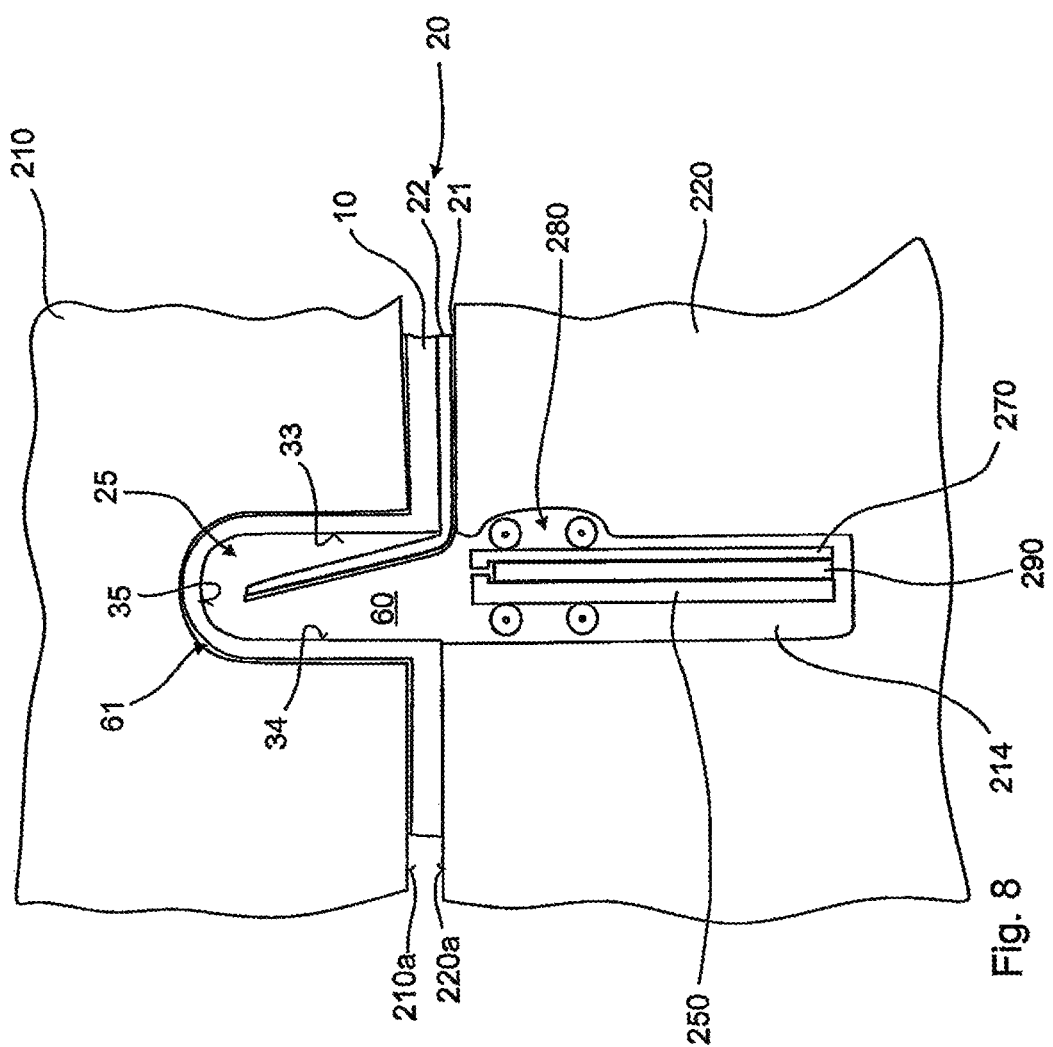
FIG. 8 a partial cutout of a cross-section of the tooling station according to FIG. 3 in the state when moved together, wherein the semi-finished part for the manufacture of the support part and the semi-finished part for the manufacture of the decorative layer lie in the tooling station, wherein the positioner and the slider according to the illustration of FIG. 7 are situated respectively in a retracted position, so that an edge section of the decorative layer is situated exposed in the region of the support part groove.

In FIG. 5 an embodiment of the positioner 250 is illustrated, which forms in the internal region 60 of the embodiment of the support part groove 50 according to FIG. 1 in a pre-forming or in the tooling station 200. The edge region section 250a of the positioner 250 is constructed such that the latter can move into the various sections of the support part groove 50. Therefore, the edge region section 250a of the embodiment of the positioner 250 illustrated in FIG. 5 has: a central edge section 255 for moving into the groove centre region 55 and two lateral edge sections 253 and 254 for moving into the groove lateral sections 51 or respectively 52. The shape of the positioner 250 is formed by the shape and the course of the edge line 255a of the central edge section 255 and of the edge lines 253a and 254a of the lateral edge sections 253 or respectively 254.

Here, the central edge section 255 with the edge line 255a for moving into the groove central section 55, and two lateral edge sections 263 and 254 with the edge lines 253a and 254a for moving into the groove lateral sections 53 or respectively 54, are provided. As generally the at least one groove lateral section 53 or respectively 54 of the lining part L according to the invention runs as a whole in a different orientation to the groove central section 55, the edge line 253a or 254a of the at least one lateral edge section 253 or 254 of the positioner 250 also runs as a whole in a different orientation to the central edge section 255 of the positioner 250.

Optionally between the edge line 255a of the central edge section 255 of the positioner 250 and the respective edge line 253a or 254a of the at least one lateral edge section 253 or 254 there can be respectively an edge line section 251a or respectively 252a, which respectively form a recess 251 or respectively 252. The edge line section 251a or respectively 252a form here an indentation in the course of the edge line of the positioner 250, so that the edge lines 253a or 243a in particular can have two turning points W251a, W251b or respectively W252a, W252b, over which the edge line section 251a or respectively 252a respectively continue into a depression.

In an embodiment of the lining part L such that the latter has an L-shape in cross-section, in the positioner 250 a corresponding one to the described lateral edge section 253 or 254 with the edge lines 253a or 254a can be dispensed with.

In the embodiment of the support part 10 or of the lining part L or respectively of the first shaping contour surface 210a, which has at least one lateral section 11, 12 or respectively which has at least one tool surface lateral section 233, 234, which has a different orientation to a central section 15 or respectively tool surface central section 235, the lateral edge section 253 or 254 also have a different orientation to the central edge section 255 of the positioner 250. For different orientation, the definition can be authoritative here which has been described in connection with the orientations of the respective sections of the support part 10 or of the lining part L or respectively of the first shaping contour surface 210*a*.

In FIG. 7 an embodiment of the slider 270 is illustrated, which forms in the internal region 60 of the embodiment of the support part groove 50 according to FIG. 1 in a performing or in the tooling station 200. The edge region section 270*a* of the slider 270 is constructed such that the latter can move into the various sections of the support part groove 50. Therefore, the edge region section 270*a* of the embodiment of the slider 270 illustrated in FIG. 7 has: a central edge section 275 for moving into the groove centre section 55 and two lateral edge sections 273 and 274 for moving into the groove lateral sections 51 or respectively 52. The shape of the slider 270 is formed by the shape and the course of the edge line 275*a* of the central edge section 275 and of the edge lines 273*a* and 274*a* of the lateral edge sections 273 or respectively 274.

In the embodiment of the support part 10 or of the lining part L or respectively of the first shaping contour surface 210*a*, which has at least one lateral section 11, 12 or respectively which has at least one tool surface lateral section 233, 234, which has a different orientation to a central section 15 or respectively tool surface central section 235, the lateral edge section 273 or 274 also have a different orientation to the central edge section 275 of the slider 270. For different orientation, the definition can be authoritative here which has been described in connection with the orientations of the respective sections of the support part 10 or of the lining part L or respectively of the first shaping contour surface 210*a*.

Here, the central edge section 275 with the edge line 275*a* for moving into the groove central section 55 and two lateral edge sections 273 and 274 with the edge lines 273*a* and 274*a* for moving into the groove lateral sections 53 or respectively 54 are provided. As generally the at least one groove lateral section 53 or respectively 54 of the lining part L according to the invention runs as a whole in a different orientation to the groove central section 55, the edge line 273*a* or 274*a* of the at least one lateral edge section 273 or 274 of the slider 270 also runs as a whole in a different orientation to the central edge section 275 of the slider 270.

Optionally between the edge line 275*a* of the central edge section 275 of the positioner 270 and the respective edge line 273*a* or 274*a* of the at least one lateral edge section 273 or 274 there can be respectively an edge line section 271*a* or respectively 272*a*, which respectively form a recess 271 or respectively 272. The edge line section 271*a* or respectively 272*a* form here an indentation in the course of the edge line of the slider 270, so that the edge lines 273*a* or 274*a* in particular can have two turning points W271*a*, W271*b* or respectively W272*a*, W272*b*, over which the edge line section 271*a* or respectively 272*a* respectively continue into a depression.

In an embodiment of the lining part L such that the latter has an L-shape in cross-section, in the slider 270 a corresponding one to the described lateral edge section 273 or 274 with the edge lines 273*a* or 274*a* can be dispensed with.

The tool parts are moved together, whilst the decorative layer 20 lies against the first shaping contour surface 210*a* and the support layer 10 lies against the second shaping contour surface 220*a*. Through the moving together of the tool parts, a connection of decorative layer 20 and support layer 10 takes place. Provision can be made here that a corresponding pressing power is exerted onto the tool parts. Furthermore, provision can be made that the tool parts or one of the tool parts is heated, in order to bring the decorative layer 20 and the support part 10 into a state which is particularly capable of connection, e.g. in which a corresponding one or layer which lies facing the respectively other connection partner is fused on. Alternatively or additionally, an adhesive can also be used, which is applied before the moving together of the tool parts onto the first surface 10*a* of the support part 10 and/or onto the second surface 20*b* of the decorative layer 20.

Figure 4:
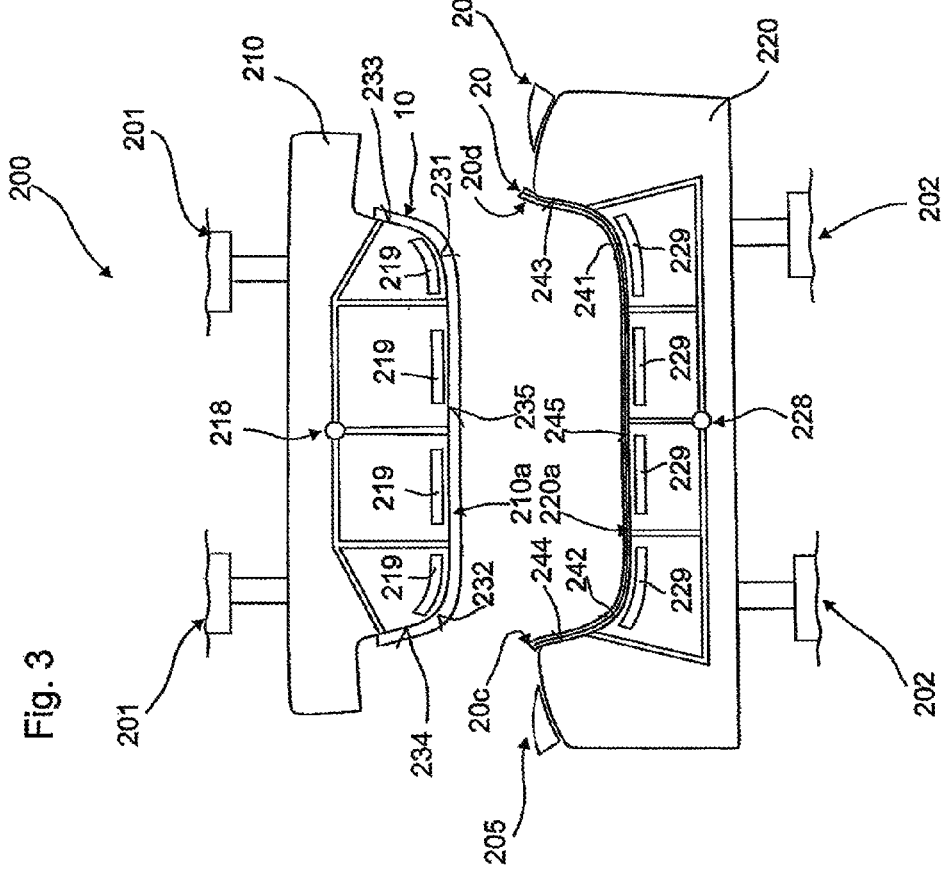
FIG. 4 the tooling station according to FIG. 3 in the state when moved together, wherein the semi-finished parts for manufacturing the support layer and the decorative layer are arranged in the tooling station.

In FIG. 4 the tooling station 200 is shown in the state when moved together, wherein the semi-finished parts for manufacturing the support layer 10 and the decorative layer 20 are inserted in the tooling station 200.

Figure 9:
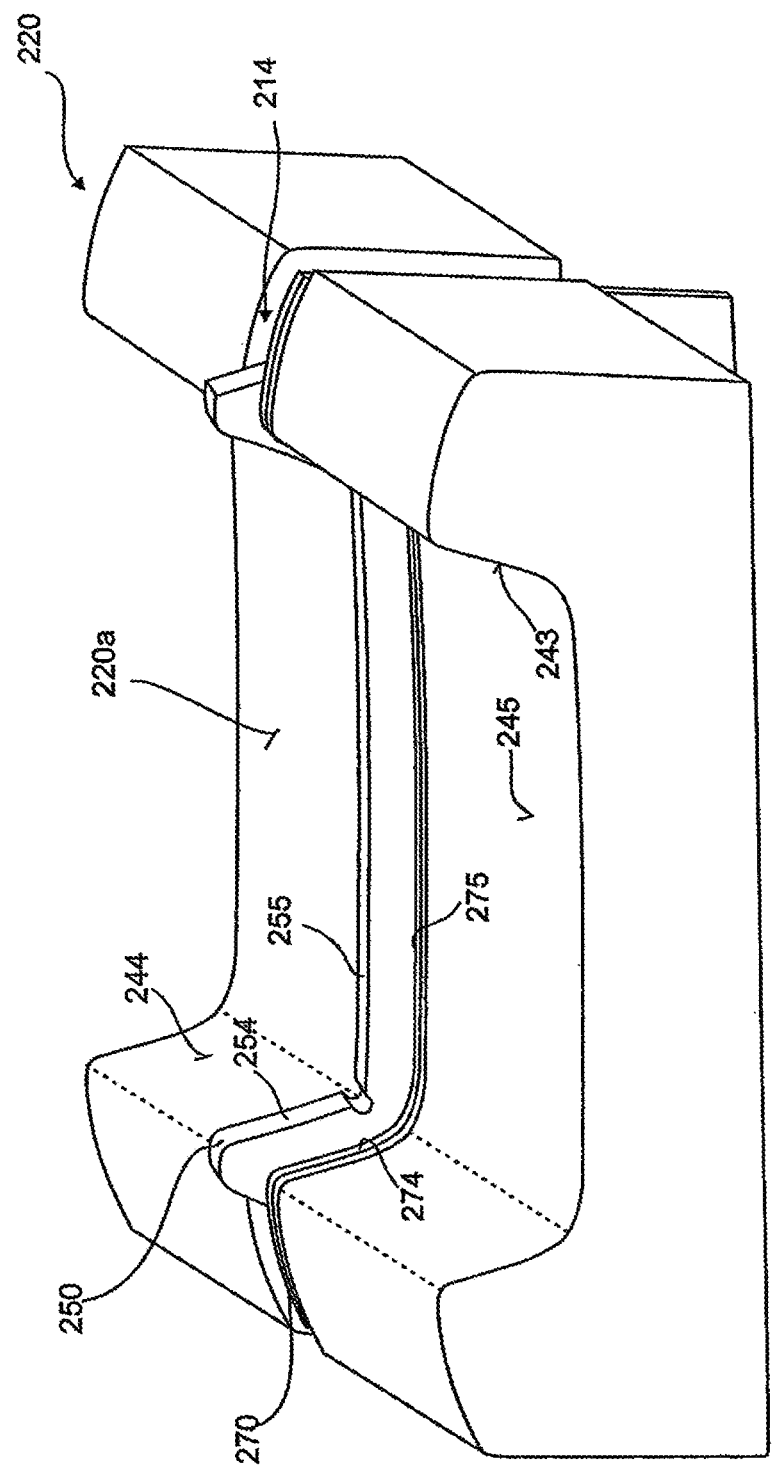
FIG. 9 the first tool part with the positioner according to FIG. 5 and with the slider according to FIG. 6, wherein the positioner is situated in an extended position and the slider is situated in a retracted position.

According to the invention, provision can be made that on moving together of the first and the second tool part 210, 220, the positioner 250 is still in the retracted state (FIG. 5), so that an edge section 25 of the decorative layer 20 is situated exposed in the region of the support part groove 50 (FIG. 8), and is only extended in the moved-together state of the first and second tool part 210, 220 (FIG. 9). Through the extension, a pre-positioning takes place of the edge section 25 of the decorative layer 20 in the region of the support part groove 50 by the positioner 250.

Figure 10:
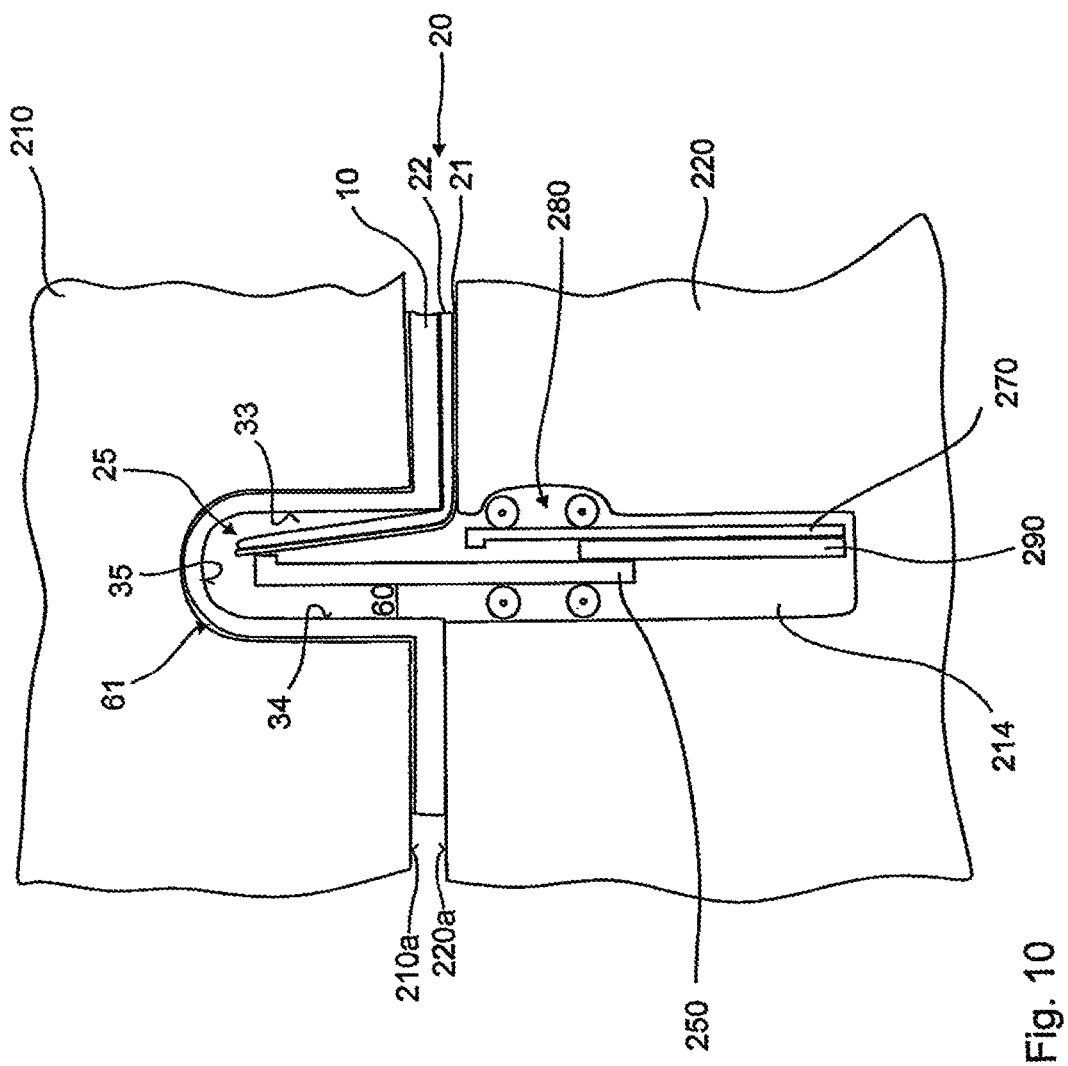
FIG. 10 the tooling station according to FIG. 3 in the illustration of FIG. 8, wherein the positioner is situated in the extended position and the slider is situated in a retracted position, so that the positioner pre-positions the edge section of the decorative layer in the region of the support part groove.

Alternatively thereto, provision can be made that the positioner 250, on moving together of the first and the second tool part 210, 220, is already in the extended state (FIG. 9). With this procedure, with the moving together of the first and the second tool part 210, 220, the positioner 250 positions the edge section 25 of the decorative layer 20 in the region of the support part groove 50, as is shown in FIG. 10.

In a further method step in addition to the extended positioner 250, the slider 270 is additionally brought into its extended position (FIG. 11), so that the slider 270 places the edge section 25 of the decorative layer 20 onto a lateral flank 33 (FIG. 2) of the support part groove. This state is shown in FIG. 1.

The slider 270 can have a heating device. Provision can be made here that the slider 270 is heated in the extended state, in order to bring the edge section 25 of the decorative layer 20 in connection with the lateral flank 33.

In a further step, provision can be made that the tooling station 200 is opened by moving apart the first and the second tool part 210, 220, so that the lining part L can be removed from the tooling station 200.

Provision can be made in particular that after the opening of the tooling station 200 the formation of an edgefold takes place on at least an end section of the support part 10, by an edge region 20*c*, 20*d*, projecting on the respective end section 10*c* or respectively 10*d* of the support part 10, being turned over from the visible side S1 to the reverse side S2 of the support part 10 by means of a respective edgefold slider 205.

The invention claimed is:

1. A tooling station for manufacturing a lining part, which is formed from a support part and a decorative layer situated thereon, wherein the support part has a convexity section forming a support part longitudinal groove and wherein the decorative layer extends laterally to the support part longitudinal groove and an edge section of the decorative layer lies against a groove lateral face, the tooling station having:
    a first tool part with a first shaping surface to receive the support part, wherein in the first shaping surface a tool groove is constructed to receive or form the support part longitudinal groove,
    a second tool part with a second shaping surface to receive the decorative layer, wherein the second tool part has: a tool recess, a positioner, which is movable by means of an adjustment device, coupled therewith, from a retracted position in the tool recess into a position partially extended from the latter, a slider, which is movable by means of an adjustment device, coupled therewith, from a retracted position in the tool recess into a position partially extended from the latter, wherein the positioner and the slider are arranged in the second tool part such that in their extended position they project respectively with an end section into the tool groove of the first tool part and wherein the end section of the slider is situated adjacent to a groove lateral face of the tool groove such that it brings an end section of the decorative layer semi-finished part, situated on a lateral wall of the support part longitudinal groove, into abutment thereto.

2. The tooling station according to claim 1, wherein the second tool part has an adjustment device coupled with the positioner, and an adjustment device coupled with the slider, with which respectively the positioner and the slider are movable from a retracted position into a position partially extended therefrom.

3. The tooling station according to claim 1, wherein the positioner and the slider are movable by means of the same adjustment device.

4. The tooling station according to claim 1,
   wherein the first shaping surface has a tool surface central section and at least one tool surface lateral section oriented differently to the tool surface central section,
   wherein the second shaping surface is formed in a complementary manner to the first shaping surface, has a tool surface central section and at least one tool surface lateral section oriented differently to the tool surface central section.

* * * * *